Figure 1:
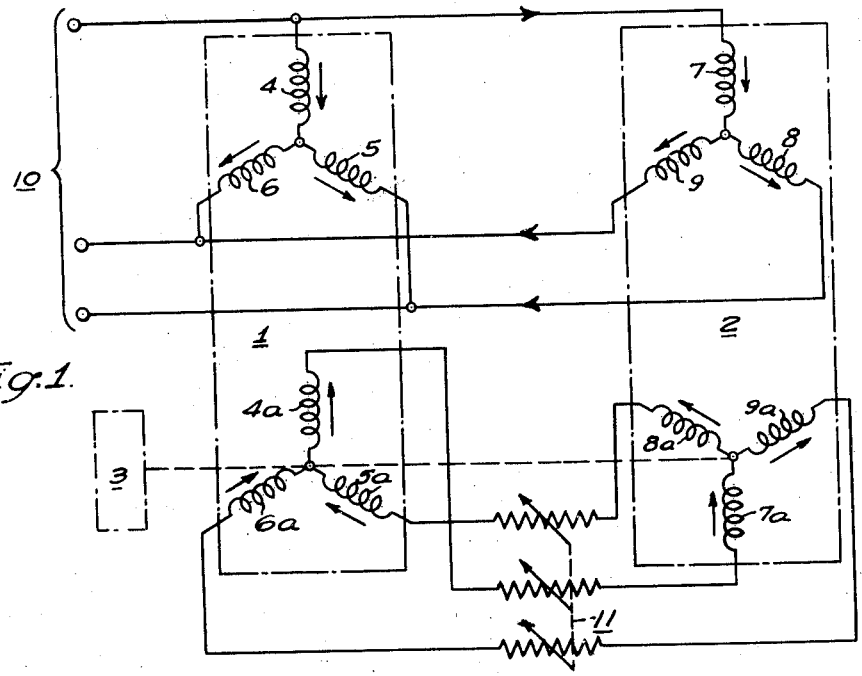

Patented Mar. 14, 1950

2,500,595

UNITED STATES PATENT OFFICE 2,500,595

CONTROL SYSTEM FOR MECHANICALLY COUPLED INDUCTION MOTORS

James Buchan Young and Albert John Riches, Stafford, England, assignors to The English Electric Company Limited, London, England, a company of Great Britain Application April 29, 1947, Serial No. 744,712
In Great Britain July 27, 1945

Section 1, Public Law 690, August 8, 1946
Patent expires July 27, 1965

3 Claims. (Cl. 318—44)

This invention relates to the operation and control of polyphase induction motors driving a common load.

It is well known in the art for two polyphase induction motors of the wound rotor type and sharing a common load to be connected to a common supply and to have their secondary or rotor windings connected either to independent starting resistances or in parallel to a common starting resistance.

Due to the fact that the motors are driving a common load they must of necessity operate at the same slip but the load sharing of the motors is dependent upon their natural slip, i. e., upon the rotor current and resistance—including any external resistance which may be in circuit—and with either of the above-mentioned methods it has been found very difficult to ensure that the same current and resistance do in fact exist in each rotor, with the result that the load is shared unequally and one motor is overloaded whilst the other motor is underloaded.

A further disadvantage is that where two independent starting resistances are used, it is essential in starting up that similar sections of the two resistances be cut out simultaneously in order to ensure correct load sharing during this period, whilst when a common resistance is used it must be of sufficient capacity to carry the current of both rotors. A still further disadvantage is that any phase displacement between the voltage vectors of each rotor due to practical limitations in the lining up of the two rotors results in a circulating current flowing through the secondary windings.

It is the object of the present invention to overcome these disadvantages and provide a simple and satisfactory method of operation and control of a pair of polyphase wound rotor type induction motors connected to a common power supply and driving a common load.

According to the invention the two rotors are mechanically interconnected and the corresponding phases of the secondary windings connected together to form a closed circuit in such manner that the E. M. F. induced in any one phase of one secondary winding is in phase opposition, viewed with respect to the star points of the windings, with the E. M. F. induced in that phase of the other secondary winding to which it is connected, whereby the E. M. F.'s are in series in the closed circuit and support each other in said closed circuit.

The term "phase opposition" is meant to indicate that the vector representing the induced E. M. F. in any one phase of the secondary of one motor is displaced 180 electrical degrees from the vector representing the induced E. M. F. in the corresponding phase of the secondary of the other motor viewed with respect to the star points of the secondary windings. The corresponding phases are thus in effect connected in series with the same value of current flowing therethrough and any slight phase difference in the two E. M. F.'s due to inaccurate aligning of the two rotors and/or any slight difference of magnitude will be of little practical significance, the resulting vector for a three phase rotor being three E. M. F.'s of equal magnitude and phase displacement.

The primary windings may be connected in parallel or in series, either star or delta as required. Where the windings are connected in series each one will, of course, be designed to operate at half the normal supply voltage. With similar secondary resistances, and therefore similar slips, the supply voltage will divide equally over the two primary windings, but in actual practice slight differences in the resistance of the two secondary windings are unavoidable with the result that when the motors are driving a common load the actual slip of one machine is slightly more than its normal slip whilst the actual slip of the other machine is slightly less than its normal slip.

This readjustment of slip automatically results in the supply voltage dividing over the two primary windings in such a way that the motor having the low resistance secondary winding operates at slightly less than half normal supply voltage whilst the motor having the high resistance secondary winding operates at slightly more than half normal supply voltage and thus the variation in slip is compensated for by the variation in voltage on the two primary windings. In view of the fact that slip varies inversely as the square of the primary voltage, the deviation of voltage of the two primary windings will, however, be quite small.

The two motors should preferably have substantially similar characteristics. Motors having different characteristics may, however, be used but if the load is such that the series current exceeds the rated secondary current of either of the motors, that motor will of course be overloaded.

According to a further feature of the invention, a variable resistance common to both motors is inserted in the connections between each phase of the secondary windings of the two motors.

In the drawing—

Figure 2:
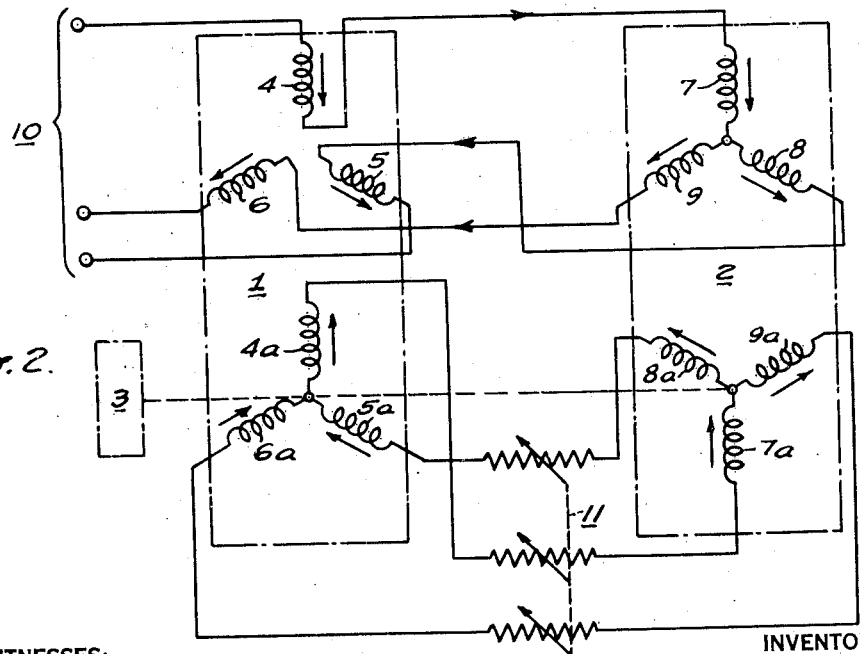

Fig. 1 diagrammatically illustrates a pair of induction motors connected along a common shaft in which the circuit connections embody the principles of this invention, and Fig. 2 diagrammatically illustrates a modification of the invention illustrated in Fig. 1.

In one particular method of practicing the invention as illustrated by Fig. 1 of the accompanying drawings, the two motors diagrammatically indicated at 1 and 2 have their shafts mechanically interconnected and drive a common load diagrammatically indicated at 3. The shafts may be directly coupled together or they may be coupled through the intermediary of the load. The primary windings 4, 5 and 6 of the motor 1 and the primary windings 7, 8 and 9 of the motor 2 are both connected in star and paralleled across the supply 10, the direction of current flow at one particular instant being indicated by the arrows.

The secondary windings 4a, 5a and 6a of the motor 1 and the secondary windings 7a, 8a and 9a of the motor 2 are also connected in star but the two rotors are mechanically connected to the load in a position in which their secondary windings are displaced 180 electrical degrees relative to each other. Corresponding phase ends of the two secondary windings are connected together and one leg of a triple pole variable resistance 11 (which may be of the liquid type) is inserted in each of the connections. The direction of current flow at the instant corresponding to that indicated for the primary windings is shown by the arrow.

It will be seen that the E. M. F.'s induced in corresponding phases of the two secondary windings are in phase opposition and support each other in a closed circuit whereby the current flows in series through corresponding phases and through the variable resistance 11. The motors may be started up by gradually cutting out the resistance 11 in the connections between the two windings.

In an alternative method of practicing the invention as illustrated in Fig. 2, the two secondary windings are displaced 180 electrical degrees relative to each other and are connected together as in Fig. 1, but in this case corresponding phases 4 and 7, 5 and 8, 6 and 9, of the two primary windings are connected in series to the common supply 10.

In yet another alternative method the two rotors may be lined up with their secondary windings in the same angular position relative to their respective primary windings and with corresponding phases of the two primary windings connected either in series or parallel but with ends reversed relative to each other whereby the E. M. F.'s induced in the two secondary windings are again in phase opposition and support each other. Alternatively, instead of reversing the phase ends of the primary windings, the same effect may be obtained by reversing the ends of the phases of the secondary windings which are connected together.

It will be understood that the invention is not limited to motors having three phase primary windings and three phase secondary windings or to motors having star connected primary and secondary windings. Both windings may, for example, be delta connected or one winding may be star connected and the other delta connected. Furthermore, one motor may have its windings connected differently from the windings on the other motor provided always that the two motors are mechanically coupled with their rotors in such position that the E. M. F.'s in the two secondary windings are in phase opposition and support each other.

The foregoing disclosure and the showings made in the drawings are merely illustrative of the principles of this invention and are not to be interpreted in a limiting sense. The only limitations are to be determined from the scope of the appended claims.

We claim as our invention:

1. A system for driving a common load by two polyphase induction motors, each having polyphase primary and secondary windings and the two rotors being mechanically connected comprising, in combination, circuit means for connecting the primary windings of said induction motors to a common source of polyphase electrical energy, said rotors being mechanically indexed to produce induced E. M. F.'s in opposition in the corresponding phases, and variable resistance starting resistors connecting the corresponding phases of the secondary windings in series circuit relation.

2. A system for driving a common load by two polyphase induction motors, each having polyphase primary and secondary windings and the two rotors being mechanically connected comprising, in combination, circuit means for connecting the primary windings of said induction motors to a common source of polyphase electrical energy, said rotors being mechanically indexed to produce induced E. M. F.'s in opposition in the corresponding phases, a circuit connection between each of the corresponding phases of the secondary windings connecting the corresponding phases in series circuit relation, a variable resistor forming a part of each circuit connection, and means for simultaneously varying the resistance of each resistor.

3. In combination a pair of polyphase induction motors each having a stator and a rotor, a polyphase primary winding on each stator, a polyphase secondary winding on each stator, a common shaft connecting said rotors, circuit means for connecting the primary windings of said induction motors to a common source of polyphase electrical energy, a resistor connected in series between the corresponding phase ends of each phase of the two secondary windings forming a series circuit in each case, the rotor of one induction motor being indexed with respect to the rotor of the other induction motor so that the corresponding phase voltages of the polyphase secondary windings are in series aiding relation in the respective series circuits.

JAMES BUCHAN YOUNG.
ALBERT JOHN RICHES.

REFERENCES CITED

The following references are of record in the file of this patent:

UNITED STATES PATENTS

| Number | Name | Date |
|---|---|---|
| 568,350 | Hunting | Sept. 20, 1896 |
| 1,791,498 | Halliburton et al. | Feb. 10, 1931 |
| 1,863,408 | Hull | June 14, 1932 |
| 2,041,510 | Parvin | May 19, 1936 |

FOREIGN PATENTS

| Number | Country | Date |
|---|---|---|
| 123,310 | Switzerland | Nov. 16, 1927 |